(12) United States Patent
Schelberg et al.

(10) Patent No.: US 7,611,177 B1
(45) Date of Patent: Nov. 3, 2009

(54) REAR BUMPER WITH SMART KEY SENSOR

(75) Inventors: David William Schelberg, Birmingham, MI (US); Mingher Fred Shen, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/187,004

(22) Filed: Aug. 6, 2008

(51) Int. Cl.
*B60R 19/26* (2006.01)
(52) U.S. Cl. .................................... 293/132; 293/102
(58) Field of Classification Search ................. 293/102, 293/132
See application file for complete search history.

(56) References Cited

U.S. PATENT DOCUMENTS 6,334,639 B1   1/2002   Vives et al.
6,609,740 B2   8/2003   Evans
6,637,788 B1   10/2003  Zollner et al.
7,293,809 B2   11/2007  Suzuki et al.
2005/0193828 A1 * 9/2005 Morikawa ................... 73/777

FOREIGN PATENT DOCUMENTS

WO   WO-2007/133340   11/2007

* cited by examiner

*Primary Examiner*—Lori L Lyjak
(74) *Attorney, Agent, or Firm*—Gifford, Krass, Sprinkle, Anderson & Citkowski, P.C.

(57) ABSTRACT

A bumper for a motor vehicle that includes a proximity sensor is provided. The bumper includes a bumper beam having a vehicle surface and an energy absorbing surface, the vehicle surface having a bracket to attach to a forward end or rearward end of the motor vehicle. An energy absorber extends along a length of the bumper beam, the energy absorber having a bumper beam side and an impact side. The bumper beam side of the energy absorber can have a tab to attach to the energy absorbing surface of the bumper beam and the impact side can have a plurality of box-shaped energy absorbing sections and a sensor section. The proximity sensor is attached to the energy absorber at the sensor section.

19 Claims, 2 Drawing Sheets

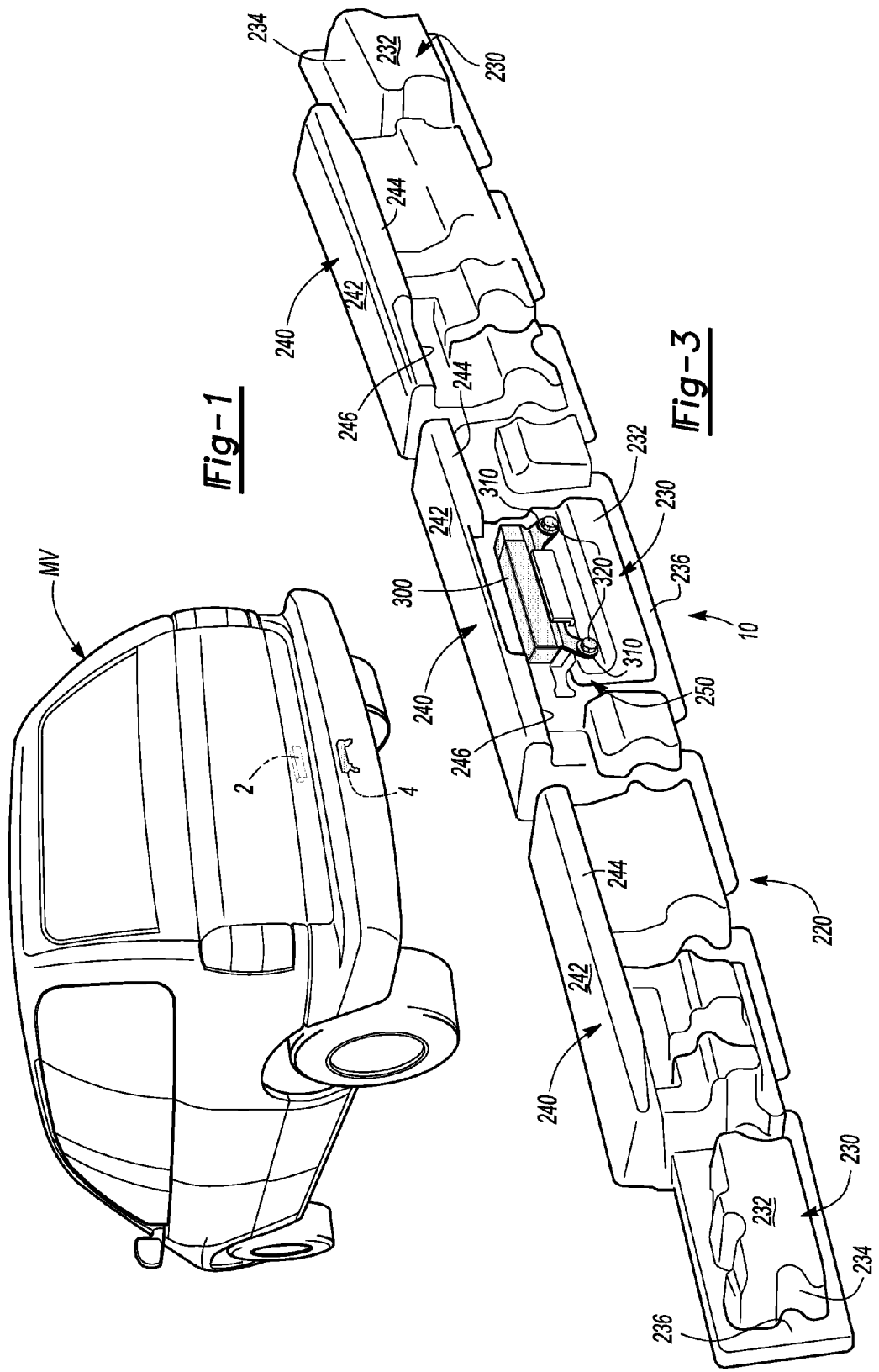

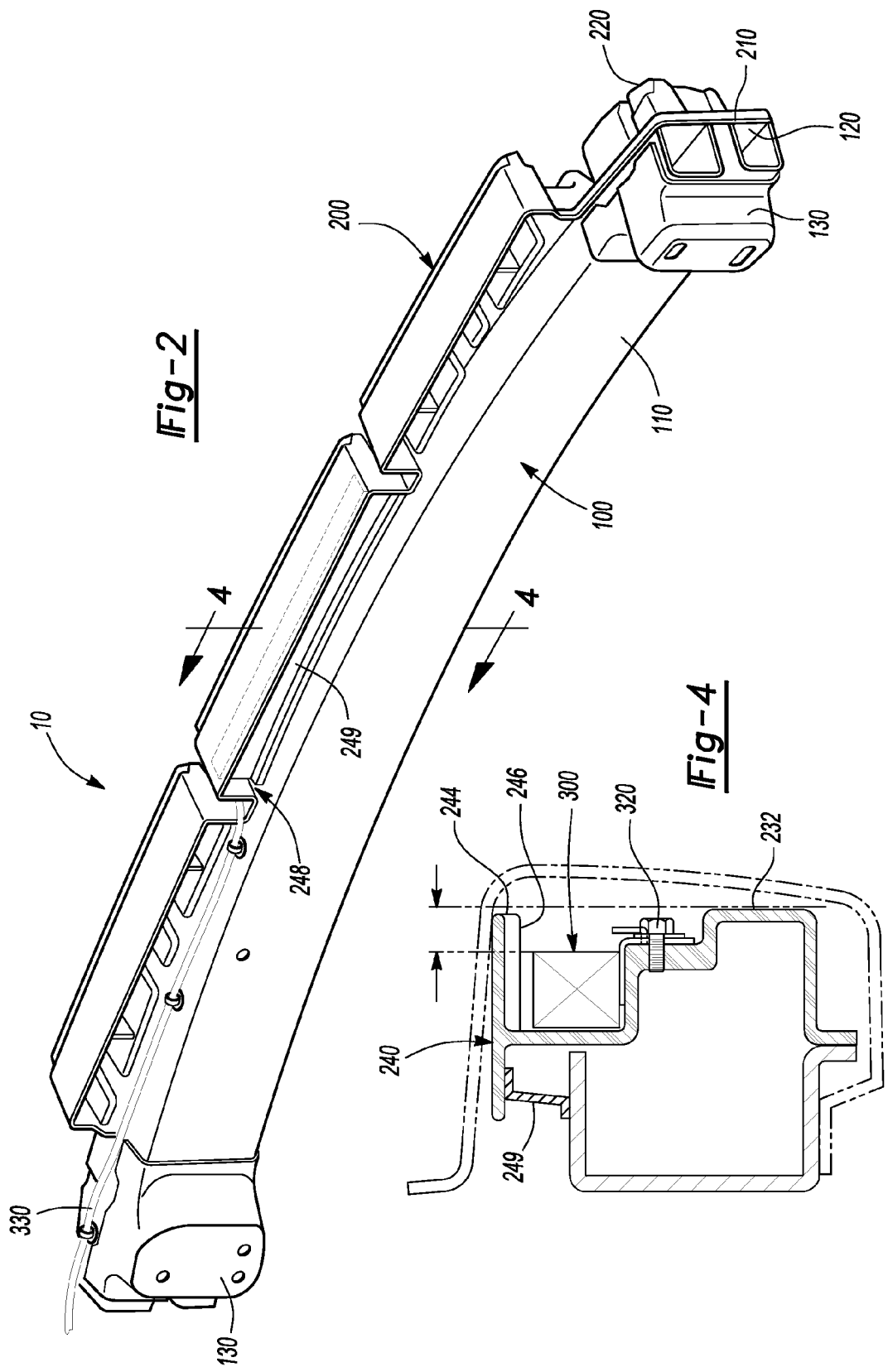

REAR BUMPER WITH SMART KEY SENSOR

FIELD OF THE INVENTION

The present invention is related generally to a rear bumper of a motor vehicle, and in particular, to a rear bumper having a proximity sensor attached thereto.

BACKGROUND OF THE INVENTION

Most motor vehicles use bumpers positioned at the front and the rear of the vehicle. The bumper can include a steel bumper beam with energy absorbers attached thereto, the energy absorbers providing an initial level of energy absorption during a low-impact collision. In addition, the energy absorbers can provide a supplemental level of energy absorption during a high-impact collision.

Advanced keys or keyless entry systems allow for a driver to keep a car key in his or her pocket while the motor vehicle doors are automatically unlocked. The key is identified by a proximity sensor located on or within the motor vehicle if the driver is within a predetermined distance from the sensor. Thereafter, the vehicle can be automatically unlocked as soon as a door handle, trunk lid and the like is actuated. Such a system is often referred to as a smart key system with the proximity sensor located in a car door, rear hatchback panel and the like.

Although smart key systems are known to those in the art, the placement of the proximity sensor adjacent to or near ferrous alloy components such as door panels can restrict the signal strength of the sensor and thereby limit the usefulness and convenience of the system. Therefore, a location for the proximity sensor where improved signal strength is provided would be desirable.

SUMMARY OF THE INVENTION

A bumper for a motor vehicle that includes a proximity sensor is provided. The bumper includes a bumper beam having a vehicle surface and an energy absorbing surface, the vehicle surface having a bracket to attach to a forward end or rearward end of the motor vehicle. An energy absorber extends along a length of the bumper beam, the energy absorber having a bumper beam side and an impact side. The bumper beam side of the energy absorber is attached to the energy absorbing surface of the bumper beam and the impact side can have a plurality of box-shaped energy absorbing sections and a sensor section. The proximity sensor is attached to the energy absorber at the sensor section.

The bumper beam can have a B-shaped cross section and/or be made from steel. The sensor section of the energy absorber can be in the form of a recess on the impact side and be bounded by an upper support surface section and at least one of the plurality of box-shaped energy absorbing section. The proximity sensor can be located at least partially below the upper support surface section of the energy absorber and/or does not extend beyond an impact surface of the at least one bounding box-shaped energy absorbing section. The proximity sensor can include electrical wiring for electrically connecting the sensor to a controller, or in the alternative have a wireless capability of communicating with the controller. In addition, the sensor section and the sensor can be located proximate to the middle of a longitudinal length of the energy absorber.

BRIEF DESCRIPTION OF THE DRAWINGS

FIG. 1 is a rear perspective of a motor vehicle illustrating a prior art location and a present embodiment location of a proximity sensor;

FIG. 2 is a front of vehicle perspective view of a bumper according to an embodiment of the present invention;

FIG. 3 is a rear of vehicle perspective view of the embodiment shown in FIG. 2; and FIG. 4 is a side cross-sectional view of the section 4-4 shown in FIG. 2.

DETAILED DESCRIPTION OF THE INVENTION

The present invention discloses a bumper for a motor vehicle, the bumper having a proximity sensor attached thereto. As such, the bumper has utility as a component for a motor vehicle. For the purposes of the present invention, the term "proximity sensor" is defined as a sensor that can wirelessly detect a predefined object within a predetermined distance of the sensor. The predefined object can include, but is not limited to, a motor vehicle key, a key fob, and identity tag or device and the like.

The bumper includes a bumper beam that has a vehicle surface and an energy absorbing surface. The vehicle surface has a bracket to attach to a forward end or a rearward end of a motor vehicle. The bumper also includes an energy absorber that extends along a longitudinal length of the bumper beam, the energy absorber having a bumper beam side and an impact side. The bumper beam side is attached to the energy absorbing surface of the bumper beam and the impact side can have a plurality of box-shaped energy absorbing sections and a sensor section. The proximity sensor is attached to the energy absorber at the sensor section.

The bumper beam can have a B-shaped cross section and may or may not be made from steel. The sensor section of the energy absorber can be in the form of a recess on the impact side and can be bounded by an upper support surface section and at least one of the plurality of box-shaped energy absorbing sections. It is appreciated that the recess can have a shape or form that affords for the proximity sensor to be placed, to fit and/or to be accepted. The proximity sensor can be located at least partially below the upper support surface section and does not extend beyond an impact surface of the at least one bounding box-shaped energy absorbing section. In this manner, the proximity sensor can be protected from a load placed on top of the bumper and/or from a low-impact to the impact side of the energy absorber.

The proximity sensor can have electrical wiring for electrically connecting the sensor to a controller, or in the alternative, the sensor can have a wireless capability of communicating with the controller. In addition, the proximity sensor can be a smart key sensor that detects a key for the motor vehicle and affords for the controller to automatically unlocked one or more of the motor vehicle doors, automatically open one or more of the motor vehicle doors, automatically start the motor vehicle engine and the like.

The bumper of the motor vehicle provides for the smart key sensor to be located proximate to the middle or center of a longitudinal length of the energy absorber. By placing the proximity sensor proximate to the middle of the length of the energy absorber, the sensor is placed a distance from steel panels and the like and thereby affords for full potential of the signal strength and/or range of detection by the sensor.

Turning now to the figures, a rear perspective view of a motor vehicle MV having a rear bumper 10 is shown in FIG. 1. A prior art location of a proximity sensor is shown in phantom at reference numeral 2 along with a location of where a proximity sensor can be located according to an embodiment of the present invention at reference numeral 4. The bumper 10 can include a bumper beam 100 and an energy absorber 200 as shown in FIGS. 2 and 3. The bumper beam 100 has a vehicle surface 110, an energy absorbing surface 120 and may or may not have a B-shaped cross-section. The vehicle surface 110 has at least one bracket 130 that affords for attaching the bumper beam 100 to a forward end or a rearward end of the motor vehicle MV. In some instances, the bracket 130 can be a crush can bracket however this is not required. In addition, the bumper beam 100 and/or bracket 130 can be made from steel, aluminum, magnesium, alloys thereof and the like.

Attached to the energy absorbing surface 120 of the bumper beam 100 can be the energy absorber 200. The energy absorber 200 extends along a longitudinal length of the bumper beam 100 as illustrated in FIGS. 3 and 4, and has a bumper beam side 210 and an impact side 220. The bumper beam side 210 is attached to the energy absorber surface 120 of the bumper beam 100. In some instances, the bumper beam surface 210 can have a tab, slot, and the like that afford for the attachment of the energy absorber 200 onto the bumper beam 100, while in other instances other methods and means can be used to attach the energy absorber 200 to the bumper beam 100, illustratively including adhesives, welding, threaded fasteners and the like.

Turning specifically to FIG. 3, the impact side 220 of the energy absorber 200 has a plurality of box-shaped energy absorbing sections 230. Each of the box-shaped energy absorbing sections 230 has an impact surface 232 and a side surface 234 that extends from the impact surface 232 to a base surface 236. It is appreciated that the plurality of box-shaped energy absorbing sections 230 provide an initial level of energy absorption during low-impact collisions and/or a supplemental level of energy absorption during high-impact collisions.

Also included as part of the energy absorber 200 can be at least one upper support surface section 240. The upper support surface section 240 has an upper surface 242, an impact surface 244 and a lower surface 246. It is appreciated that the upper support surface section 240 affords for a load to be placed on top of and supported by the bumper 10. A sensor section 250 can be in the form of a recess on the impact side 220, the recess being bounded by one of the upper support surface sections 240 and at least one of the plurality of box-shaped energy absorbing sections 230.

A proximity sensor 300 is attached to the impact side 220 of the energy absorber 200 at the sensor section 250. As illustrated in FIG. 4, the proximity sensor 300 is located at least partially below the upper support surface section 240 and does not extend beyond the impact surface 232 of the at least one bounding box-shaped energy absorbing section 230. The proximity sensor 300 can be attached to the energy absorber 200 using any method or device known to those skilled in the art, illustratively including the use of threaded fasteners, adhesives, ultrasonic welding, snaps, buttons and the like. As illustrated in FIGS. 3 and 4, the proximity sensor 300 has at least one attachment point 310 where a threaded fastener 320 affords for the secure attachment of the sensor 300 to the energy absorber 200.

The proximity sensor can include wiring 330 that affords for the sensor to be electrically connected to and communicate with a controller. It is appreciated that the controller affords for unlocking of the motor vehicle doors, opening one or more of the motor vehicle doors, starting of the motor vehicle engine and the like. In the alternative, the proximity sensor 300 can wirelessly communicate with the controller. It is appreciated that the location of the proximity sensor 300 at the sensor section 250 affords for protection of the sensor when a load is placed on top of the bumper 10 and from minor impact collisions to the impact side of the energy absorber. In some instances, the upper support surface section 240 that bounds the proximity sensor 300 can have a support bracket 249 within a cavity 248 as illustrated in FIG. 2. In this manner, greater support and protection of the proximity sensor 300 is provided.

The energy absorber can be made from any material known to those skilled in the art, illustratively including plastics such as polyphenylene oxide (PPO). In addition, the energy absorber can be an injection molded component. Regarding the proximity sensor, any proximity sensor can be used known to those skilled in the art, illustratively including a key sensor manufactured by Aisian Incorporated with part number 89997-28020.

The invention is not restricted to the illustrative examples described above. Examples are not intended as limitations on the scope of the invention. Methods, apparatus, compositions and the like described herein are exemplary and not intended as limitations on the scope of the invention. Changes therein and other uses will occur to those skilled in the art. The scope of the invention is defined by the scope of the claims.

We claim:

1. A bumper for a motor vehicle, said bumper comprising:
   a bumper beam having a vehicle surface and an energy absorbing surface, said vehicle surface having a bracket to attach to a forward end or rearward end of a motor vehicle;
   an energy absorber extending along a length of said bumper beam, said energy absorber having a bumper beam side and an impact side, said bumper beam side attached to said energy absorbing surface of said bumper beam and said impact side having a plurality of box-shaped energy absorbing sections;
   a recess on said impact side of said energy absorber, said recess forming a sensor section; and
   a sensor attached to said energy absorber at said sensor section.

2. The bumper of claim 1, wherein said bumper beam has a B-shaped cross section.

3. The bumper of claim 1, wherein said bumper beam is made from steel.

4. The bumper of claim 1, wherein said recess is bounded by an upper support surface section and at least one box-shaped energy absorbing section.

5. The bumper of claim 4, wherein said sensor is located at least partially below said upper support surface section of said energy absorber.

6. The bumper of claim 4, wherein said sensor does not extend beyond an impact surface of said at least one bounding box-shaped energy absorbing section.

7. The bumper of claim 1, wherein said sensor has electrical wiring for electrically connecting said sensor to a controller.

8. The bumper of claim 1, wherein said sensor has a wireless capability of communicating with a controller.

9. The bumper of claim 1, wherein said sensor is a smart key sensor.

10. The bumper of claim 9, wherein said smart key sensor is located proximate the middle of a longitudinal length of said energy absorber.

11. A rear bumper for a motor vehicle, said rear bumper comprising:
    a bumper beam having a front surface and a rear surface, said front surface having a bracket to attach to a rearward end of a motor vehicle;
    an energy absorber extending along a longitudinal length of said bumper beam, said energy absorber having a bumper beam side and an impact side, said bumper beam side attached to said rear surface of said bumper beam and said impact side having a plurality of box-shaped energy absorbing sections and a sensor section; and
    a smart key sensor attached to said energy absorber at said sensor section.

12. The rear bumper of claim 11, wherein said sensor section is a recess on said impact side bounded by an upper support surface section of said energy absorber and at least one box-shaped energy absorbing section.

13. The rear bumper of claim 12, wherein said sensor is located at least partially below said upper support surface section and does not extend beyond an impact surface of said at least one bounding box-shaped energy absorbing section.

14. The rear bumper of claim 13, wherein said sensor has electrical wiring for electrically connecting said sensor to a controller.

15. The rear bumper of claim 14, wherein said smart key sensor is located proximate the middle of said length of said energy absorber.

16. A rear bumper for a motor vehicle, said rear bumper comprising:
    a bumper beam having a front surface and a rear surface, said front surface having a bracket to attach to a rearward end of a motor vehicle;
    an energy absorber extending along a length of said bumper beam, said energy absorber having a bumper beam side and an impact side, said bumper beam side having a tab to attach to said rear surface of said bumper beam and said impact side having a plurality of box-shaped energy absorbing sections;
    a smart key sensor section in the form of a recess on said impact side; and
    a smart key sensor attached to said energy absorber at said smart key sensor section.

17. The bumper of claim 16, wherein said smart key sensor section is a recess bounded by an upper support surface section of said energy absorber and at least one box-shaped energy absorbing section.

18. The bumper of claim 17, wherein said smart key sensor is located at least partially below said upper support surface section and does not extend beyond an impact surface of said at least one bounding box-shaped energy absorbing section.

19. The bumper of claim 18, wherein said smart key sensor is located proximate the middle of said length of said energy absorber.

* * * * *